United States Patent [19]
Hall et al.

[11] Patent Number: 5,418,916
[45] Date of Patent: May 23, 1995

[54] CENTRAL PROCESSING UNIT CHECKPOINT RETRY FOR STORE-IN AND STORE-THROUGH CACHE SYSTEMS

[75] Inventors: Barbara A. Hall, Endwell; Kevin C. Huang, Endicott; John D. Jabusch; Agnes Y. Ngai, both of Endwell, all of N.Y.

[73] Assignee: International Business Machines, Endicott, N.Y.

[21] Appl. No.: 592,624

[22] Filed: Oct. 4, 1990

Related U.S. Application Data

[63] Continuation of Ser. No. 213,535, Jun. 30, 1988, abandoned.

[51] Int. Cl.6 .............................................. G06F 11/14
[52] U.S. Cl. .................... 395/375; 364/945.1; 364/964.2; 364/243.4; 364/267.3
[58] Field of Search ............. 364/DIG. 1 MS File, 364/DIG. 2 MS File; 395/250, 375

[56] References Cited

U.S. PATENT DOCUMENTS

| | | | |
|---|---|---|---|
| 4,020,466 | 4/1977 | Cordi et al. | 364/200 |
| 4,044,337 | 8/1977 | Hicks | 364/200 |
| 4,442,487 | 4/1984 | Fletcher et al. | 364/200 |
| 4,493,035 | 1/1985 | MacGregor et al. | 364/200 |
| 4,703,481 | 10/1987 | Fremont | 371/12 |
| 4,814,971 | 3/1989 | Thatte | 371/12 |

*Primary Examiner*—David Y. Eng
*Attorney, Agent, or Firm*—Hugh D. Jaeger

[57] ABSTRACT

A checkpoint retry system for recovery from an error condition in a multiprocessor type central processing unit which may have a store-in or a store-through cache system. At detection of a checkpoint instruction, the system initiates action to save the content of the program status word, the floating point registers, the access registers and the general purpose registers until the store operations are completed for the checkpointed sequence. For processors which have a store-in cache, modified cache data is saved in a store buffer until the checkpointed instructions are completed and then written to a cache which is accessible to other processors in the system. For processors which utilize store-through cache, the modified data for the checkpointed instructions is also stored in the store buffer prior to storage in the system memory.

2 Claims, 11 Drawing Sheets

FIG. 3a

| SLOT 0 | ADDRESS | STORE DATA DW0<br>STORE DATA DW1<br>:<br>STORE DATA DW7 | FLAGS | S | I M M | C O M P | E O I |
|---|---|---|---|---|---|---|---|
| SLOT 1 | ADDRESS | STORE DATA DW0<br>STORE DATA DW1<br>:<br>STORE DATA DW7 | FLAGS | S | I M M | C O M P | E O I |

•
•
•

| SLOT 7 | ADDRESS | STORE DATA DW0<br>STORE DATA DW1<br>:<br>STORE DATA DW7 | FLAGS | S | I M M | C O M P | E O I |
|---|---|---|---|---|---|---|---|

FIG. 3b

STORE BUFFER SLOT

| BYTE | 00 | 01 | 02 | 03 | 04 | 05 | 07 |
|---|---|---|---|---|---|---|---|
| MARK | 0 | 0 | 1 | 1 | 1 | 0 | |
| DATA | XX | XX | C9 | C2 | 04 | XX | |

DATA = XX MEANS "DON'T CARE" - NO DATA HAS BEEN STORED.
DATA = ANY TWO HEXADECIMAL DIGITS ARE THE DATA VALUE.

CENTRAL PROCESSING UNIT CHECKPOINT RETRY FOR STORE-IN AND STORE-THROUGH CACHE SYSTEMS

This application is a continuation of U.S. Ser. No. 07/213,535, filed Jun. 30,1988, entitled "Central Processing Unit Checkpoint Retry for Store-In and Store-Through Cache System", assigned to the same assignee now abandoned in favor of the present continuation patent application.

TECHNICAL FIELD

This invention relates generally to data processing systems which are equipped to detect errors, return to a previous point in the instruction stream, and reexecute the instruction which led to the error. The invention relates particularly to data processing systems which have either single or multiple processors and which may use memory cache systems involving either store-in or store-through cache designs.

CROSS REFERENCES TO RELATED APPLICATIONS

A vector processor used in the practice of this invention is described and claimed in patent application Ser. No. 06/530,842, filed Sep. 9, 1983, entitled "High Performance Vector Processor", now U.S. Pat. No. 4,967,343, issued Oct. 30, 1990, to the same assignee as the present application, and that patent application is incorporated by reference into this patent application.

A floating point processor used in the practice of this invention is described and claimed in patent application Ser. No. 07/102,985, filed Sep. 30, 1987, entitled "Dynamic Multiple Instruction Stream Multiple Data Multiple Pipeline Apparatus for Floating Point Single Instruction Single Stream Data Architecture", now U.S. Pat. No. 4,916,652, issued Apr. 10, 1990, to the same assignee as the present application, and that patent application is incorporated by reference into this patent application.

A binary adder used in the practice of this invention is described and claimed in patent application Ser. No. 07/066,580, filed Jun. 26, 1987, entitled "A High Performance Parallel Binary Byte Adder", now U.S. Pat. No. 4,914,617, issued Apr. 3, 1990, to the same assignee as the present application, and that patent application is incorporated by reference into this patent application.

BACKGROUND OF THE INVENTION

The occurrence of random errors in data processing systems has a substantial adverse effect on the reliability of a system. If a random error, i.e., one which is not due to a continuing fault in the system, occurs near the end of the execution of a lengthy program, it is necessary to restart the program and run it again from the very beginning. Because this was often an unacceptable solution, programs were segmented into distinct parts, and the occurrence of an error in one of the parts required that the program be rerun only from the beginning of the part in which the failure occurred. Even this approach became inadequate as computing speed increased and data processing systems became more complex and time dependent.

One of the aspects which complicates error recovery techniques is the use of memory cache systems. The speed of processors has increased to the point where economically feasible main memory systems are too slow to keep up. To improve memory performance without the cost of having all memory circuits match the speed of the processor, intermediate, high speed, storage systems have been introduced. Such systems, called caches, operate at close to the speed of the processor and have very limited storage capacity. Because of the limited capacity, it is necessary to carefully allocate the capacity to the data which is most likely to be used by the processor.

Various techniques have been developed to allocate the cache and control the data which is stored therein in accordance with general requirements for data processing systems. Cache systems can be classed as store-through systems, in which the revised data placed in cache is also placed in the main storage unit; as store-in cache systems, in which the data placed in cache is not placed in main storage until it is cast out and a cache miss requires the data to be read from storage to cache from which it is accessible to the processor; and hybrid systems which incorporate some of the aspects of each. In some cases, specialized adaptations have been made to accommodate particular requirements for more advanced systems. In particular, attempts have been made to accommodate the requirements for data processing systems which utilize more than one processing unit. While these approaches have been effective from the standpoint of improving cache efficiency, they have not enhanced, and in some cases even reduced, the ability of the system to recover from a soft error. Since improvement in system performance in one area which may be illusory if it is accompanied by a degradation of performance in another area, there has been a continuing need to integrate the cache management and operation with the error recovery techniques in multiple processor systems, in particular, that class of error recovery termed checkpoint retry.

While so-called multiprocessor systems include multiple processing capability, and to this extent may have discrete processors which may be assigned to different tasks or to different portions of the same task to achieve a parallel processing capability, all elements of the system are not replicated for each processor. For example, since the different processors may be required to operate on common data, each processor must have access to a common storage unit. For the same reason, each processor must be able to reach various input/output devices. Little used features of the system, or those which can be shared without substantial loss of performance, are usually not replicated for each processor. An example of this type of feature is the error recovery facility. Random errors are not likely to occur in more than one processor at a time. Since the recovery from a random error does not require a substantial period of time, the occurrence and recovery can be completed before an error occurs in another of the processors and a single error recovery facility is sufficient.

All of this would be quite simple if all the processors were the same type, particularly with regard to the type of cache used. Existing error recovery techniques work quite well with multiprocessing systems in which the processors utilize store-in cache. Typically, the cache data is saved in a backup array before a cache write operation. In a checkpoint retry operation, the cache data at the retry point is restored from the backup array. The drawbacks with this approach include the fact that the writing to cache is delayed by the necessity for writing the cache data in the backup array prior to any write to cache operation. Additionally, and perhaps more significant, in a multiprocessor system, a cache locking mechanism must be provided for exclusive status of cache data during a checkpoint period.

Other forms of existing error recovery techniques are satisfactory for use with multiprocessing systems in which the processors utilize store-through cache. However, data processing systems are commonly designed as a "family" and can be configured with various types of storage, I/O devices and even different types of processors. For example, one "member" of the family can use a multiprocessing system in which processors use store-in cache. Other "members" of the same family can be configured to use processors which incorporate store-through cache. Regardless of the election to use store-in or store-through cache, it is desirable from the standpoints of cost, manufacturing, compatibility, and maintenance to have the other elements of the system be the same throughout the entire family.

It is desirable to have a family of data processing systems which incorporates models having processors with store-in cache, as well as models with processors utilizing store-through cache. For the reasons mentioned above, it is desirable to have a single error recovery facility for the entire family.

Recovery from an error in a data processing system requires that the system be restarted from a point in the instruction sequence which preceded the error, and therefore contains data which is not affected by the error. Ideally, this would be the instruction which immediately preceded the instruction in which the error occurred. This would require the system to store and retain all the relevant data for each instruction, an intolerable overhead burden. In practice, the overhead is reduced by retaining the data only at selected points which may be spaced several instructions apart. The data saved at the selected point will usually consist primarily of the program status word (PSW), the content of the floating point registers (FPR's), the access registers (AR's), and the general purpose registers (GPR's).

Another troublesome problem with cache systems involves the ultimate matching to the speed of the main memory. The high speed cache satisfies the need for data at a speed comparable to that of the processing unit. The high speed cache does not solve the problem of reading and writing data to memory at relatively slow speeds. The prior art solution has been to provide a store buffer, which can hold a single line of cache data, between the cache and main storage. By transferring data to and from memory through the line buffer, the cache is freed up and can work at a higher speed.

SUMMARY OF THE INVENTION

A primary object of the invention is to provide a checkpoint retry facility which is compatible with either single or multiple processor systems utilizing either store-in or store-through caches.

It is another object of the invention to provide a checkpoint retry facility which utilizes a store buffer to establish a store queue during normal operation and which provides the data necessary for checkpoint retry during a retry operation.

Still another object of the invention is to provide a checkpoint retry facility which incorporates a store buffer system which serves the dual function of storing data during the checkpoint period and to better match the processor to the speed of the main memory.

The point in the instruction stream at which this data is saved is termed a checkpoint. For all central processing unit (CPU) initiated storage operations following a checkpoint, the modified data cache pages are saved in the store buffers until the storage operations are completed for the checkpointed instructions. In the case of processors with a store-in level two (L2) cache design, the modified cache data is saved in the level one (L1) store buffer until the checkpointed instructions have been completed. It is then written to the L2 cache and become visible to other processors. For processors with a store-through cache design, the modified cache data is also buffered in the L1 store buffer. When a checkpoint period is completed, the saved cache data is stored in memory.

BRIEF DESCRIPTION OF THE DRAWINGS

FIG. 3a illustrates the configuration of the store buffer.

FIG. 3b shows the various forms of a particular location in the store buffer.

DESCRIPTION OF THE INVENTION

Figure 1:
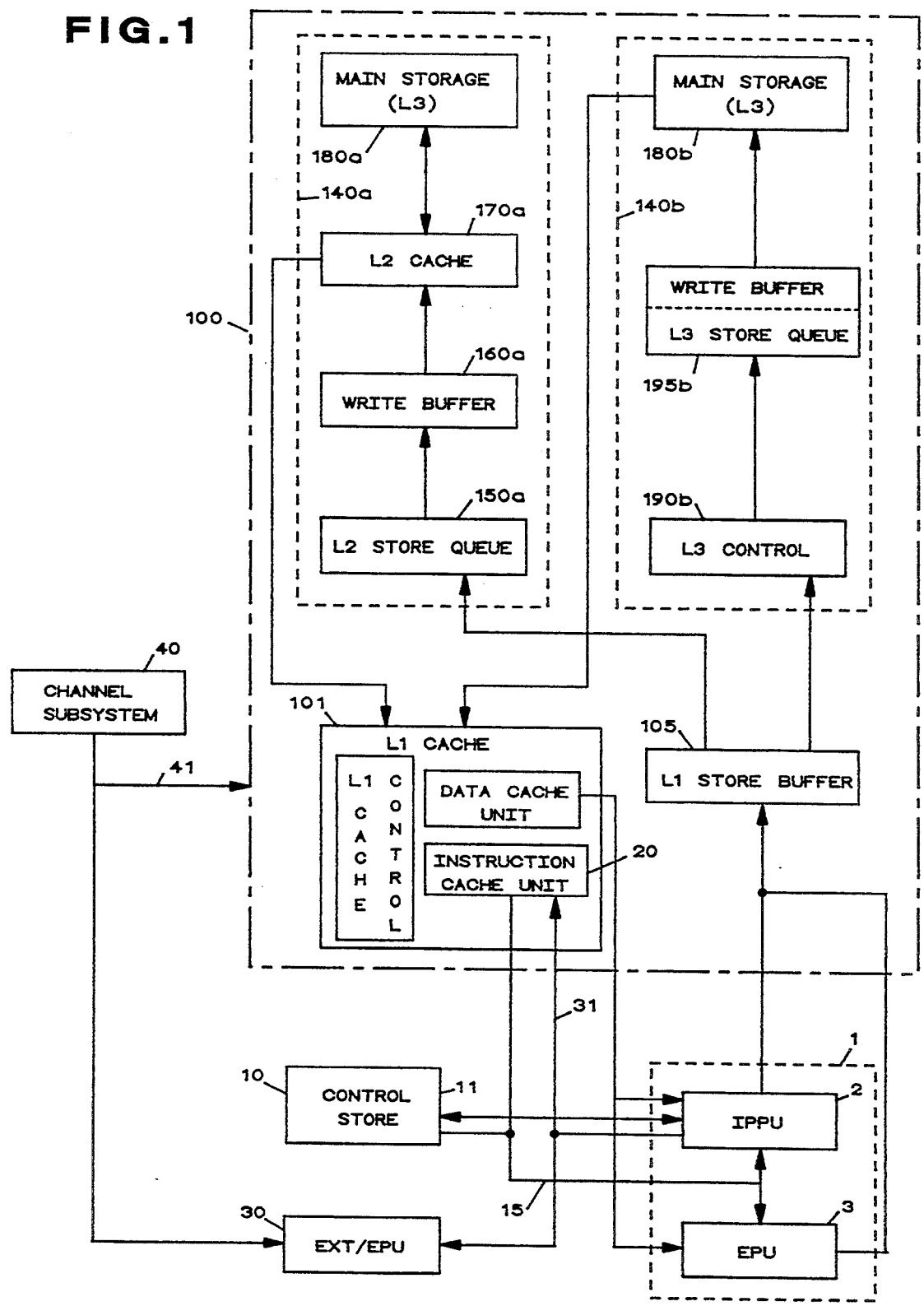
FIG. 1 is a schematic block diagram of alternative forms of data processing systems which can be accommodated by the instruction retry of this invention.

With reference to FIG. 1, the portions of a data processing system relevant to the invention are shown. For the purpose of simplification, portions of the system which are not part of the invention are not shown. It will be appreciated that the data processing system will be of the same general nature as that shown in U.S. Pat. No. 4,044,337 to G. L. Hicks, D. H. Howe, and F. A. Zurla, Jr., and assigned to the assignee of this application, International Business Machines Corporation, which is incorporated herein by reference.

The instruction processing unit 1 of the system has an instruction preprocessing unit (IPPU) 2 and a fixed point execution processing unit (EPU) 3. The IPPU 2 supplies address information for the fetching of microwords from control store 10 over control store origin address bus (CSOA) 11 and receives instructions over instruction bus (IBUS) 15 which is connected to control store 10, instruction cache unit 20 and EPU 3. IPPU 2 also is connected to instruction cache unit 20 and EXT/FPU 30 over CBUS 31. Channel subsystem 40 is connected to EXT/FPU 30 over IPC bus 41.

The data processing system having multiprocessors includes a three-level storage subsystem 100 which includes main storage unit 180a, 180b, a level two cache (L2) 170a and a high performance level one cache (L1) 101. In the case of a system with a single processor, the L2 cache may be omitted. The storage subsystem may therefore assume two forms, shown as 140a and 140b, depending on the particular model version of the family of data processing systems. The store-in cache (multiprocessor) version 140a of the storage subsystem 100 includes the L2 storage queue 150a, the write buffer 160a, the L2 cache 170a and main storage (L3) 180a. The store-through cache (single processor) version 140b, which does not include an L2 cache, includes an L3 control 190b and a write buffer/L3 storage queue 195b, and a main storage unit (L3) 180b.

In the multiprocessor version 140a, the L2 cache may be shared by all the processors and also directly accessed by the channel.

Storage subsystem 100 has elements which are common to both the store-in and store-through embodiments including L1 cache control and L1 cache 101, and the L1 store buffer 105.

Within a CPU, an instruction cache and a data cache exist at the first level, collectively referred to as L1 cache 101. Each cache maintains data for the associated CPU. The instruction preprocessing unit (IPPU) 2 receives instruction from the instruction cache and microwords from control store 10 over the instruction bus (IBUS) 15. The L1 data cache unit is connected to the fixed point execution unit 3 to provide operand data for instruction execution.

The instruction cache portion of L1 cache 101 contains IBM System/370 instructions and is accessed by the processor for instruction fetches. Operands representing the result of instruction execution do not change the contents of the instruction cache, but do invalidate the page if it exists in instruction cache 20. The data cache portion of L1 cache 101 contains the IBM System/370 program data. All data fetches and stores are made to the L1 cache 101 which is a store-through cache. When a cache miss is detected for operand fetches, the desired cache line must be inpaged from L2 cache 170a or L3 main storage 180a. When a data store request is made to the data cache, and the data exists in the cache, the data is stored in the cache and store buffer 105 at the same time. If the data does not exist in the cache, data is only stored into the store buffer. The address, data and controls associated with the store operation are placed in store buffer 105.

Central Processing Unit 1 includes hardware for the purpose of recovering from an error by returning to a checkpoint state and reexecuting the failed instruction. This includes arrays to backup the General Purpose Registers (GPR), the Floating Point Registers (FPR) and Access Registers (AR). A Program Status Word (PSW) stack is used to save the Program Status Word when a checkpoint is established. The recovery technique of this invention is to establish a known state of the CPU which can be returned to when an error is detected. To facilitate the return to the previous state, certain facilities (data, state, condition, etc.) in the CPU are routinely saved in backup arrays as instruction processing proceeds.

Figure 2:
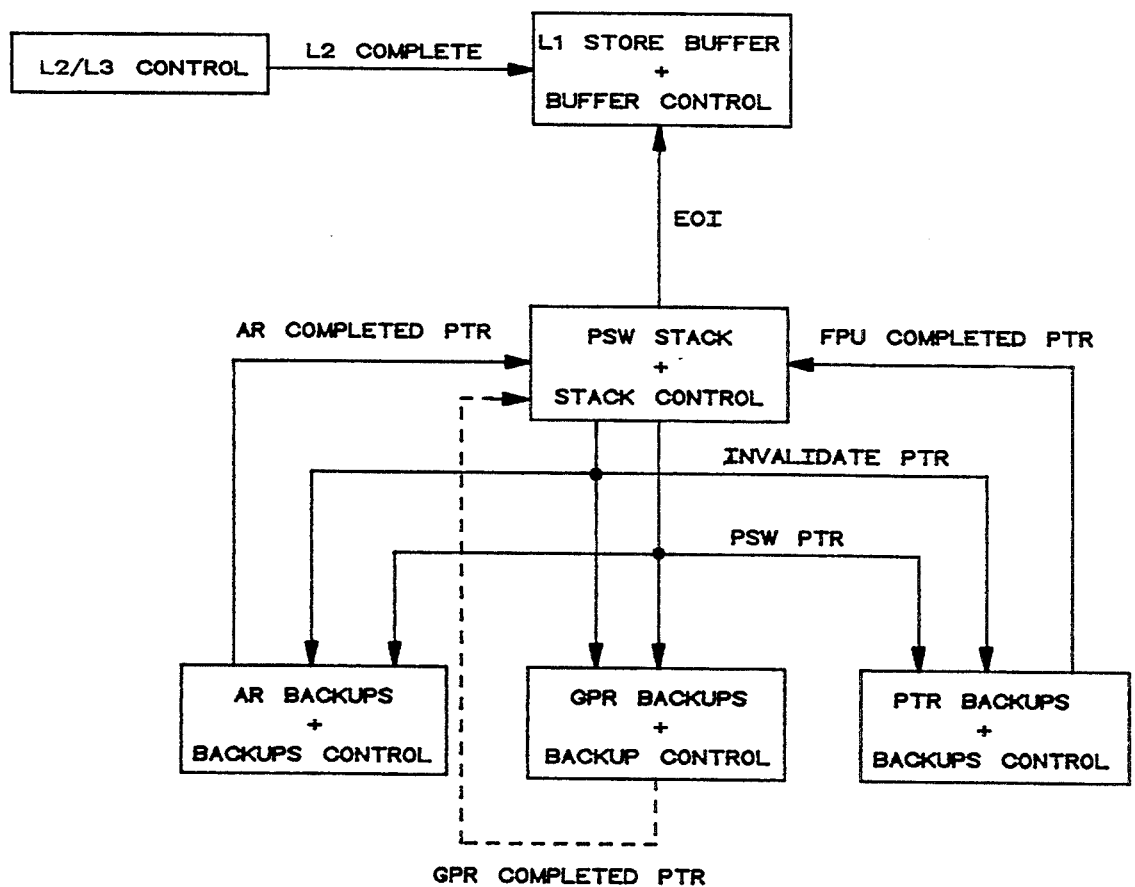
FIG. 2 is a block diagram of the instruction retry subsystem.

Turning now to FIG. 2, the manner of operation of L1 store buffer 105 is described. The store buffer is positioned logically between the instruction processing unit 1 and L2 cache 170a in the case of the store-in cache embodiment 140a, and between the instruction processing unit 1 and main storage (L3) 180b in the case of store-through cache embodiment 140b. An L1 store buffer is provided for each processing unit in the system and is used to improve performance of data transfers to main storage and also as part of the checkpoint retry mechanism to hold the storage data until the end of a checkpoint before being released to other portions of the storage hierarchy where other CPU's and channels can access the data. This is accomplished by keeping track of which store queue lines are used in which checkpoint and not releasing any store data associated with a checkpoint until the end of the checkpoint series of instructions. There are two information bits installed in the store queue design to control the release of storage data, the end of instruction (EOI) and the checkpoint complete (COMP). The data in the store buffer is available only to the processor directly associated with it. Other processors cannot access this data until it is written to L2 cache 170a or main storage 180b.

In a store-through cache, every store operation is presented to the storage control before it is written into main storage, and each store operation may be written to cache only if the relevant cache line is already in the cache. The L1 storage buffer differs from the store-through cache in that:

a. The store-through cache holds data which has been fetched from main storage and which is intended to be passed to the instruction processing unit 1. The storage buffer 105 holds data which has been stored and which is intended to go into main storage 180a or 180b. This important characteristic allows used data to be recalled during a retry operation.

b. The store buffer is usually very small (1 to 8 cache lines) because the high performance circuits used therein are relatively expensive. The store-through cache is relatively large and can typically accommodate the storage of 256 to 512 cache lines depending on how much data is desired to be retained.

c. The store-through cache is usually set-associative. The storage buffer 105 is fully associative.

d. The store-through caches contain full cache lines. The storage buffer 105 will usually contain partial cache lines.

The store buffer 105 contains eight slots as shown in FIG. 3. Each slot contains eight doublewords of data with flags indicating the doubleword and bytes of each doubleword that is modified. Each slot contains an EOI and COMP bit which indicate the status of the store operation. The number of slots in the store buffer is the number of cache lines for which the store buffer is accumulating stores. If the storage buffer consists of eight slots, then stores to any of the eight lines indicated by the storage buffer address registers are made in the store buffer. Each storage buffer address register corresponds to a specific storage buffer slot. Each byte in each storage buffer slot has a corresponding one bit "mark" which indicates whether that particular byte has been stored into, shown in FIG. 3a. When the mark is set to 1, the corresponding byte of data is valid since it has been stored into. When the mark is set to 0, the corresponding byte of data is not valid since it has not been stored into. The EOI and COMP bit are both set to zero when an entry is destined. The EOI bit is set to one at the end of the instruction and the COMP bit is set to one when the data is stored into the L2 cache or L3 main storage. The store buffer has three modes of operation; sequential, immediate, and nonsequential. The S and IMM bits indicate sequential and immediate store mode, respectively. In sequential mode, stores are performed to doublewords within a 64-byte slot. When a 64-byte boundary is crossed, the next store buffer slot is used. In nonsequential mode, every store operation uses one slot of the store buffer for a store that does not cross a 64-byte boundary. In immediate store mode, the store buffer data is made eligible for storing into L2 cache or main storage before the completion of an instruction execution.

When a store operation is executed, the data and address of the store is written into the first available entry of the store buffer along with flags indicating the doublewords and bytes of a doubleword modified. When a store buffer entry is written, a store buffer slot write pointer points to the first available slot. In sequential mode, the write pointer is not incremented until an IBM System/370 instruction is complete, or the last byte of a 64-byte page has been written. In non-sequential mode, the write pointer is incremented for every store operation. The store buffer data is sent to the L2 cache control or L3 control when the data bus is available. On receipt of the EOI signal from the CPU, the L2 cache control or L3 control will write the store buffer data into the L2 cache or L3 main storage. A complete signal is sent to the L1 cache control when the store is complete. Thus, the store buffer slot will be available once again.

Figure 4A:
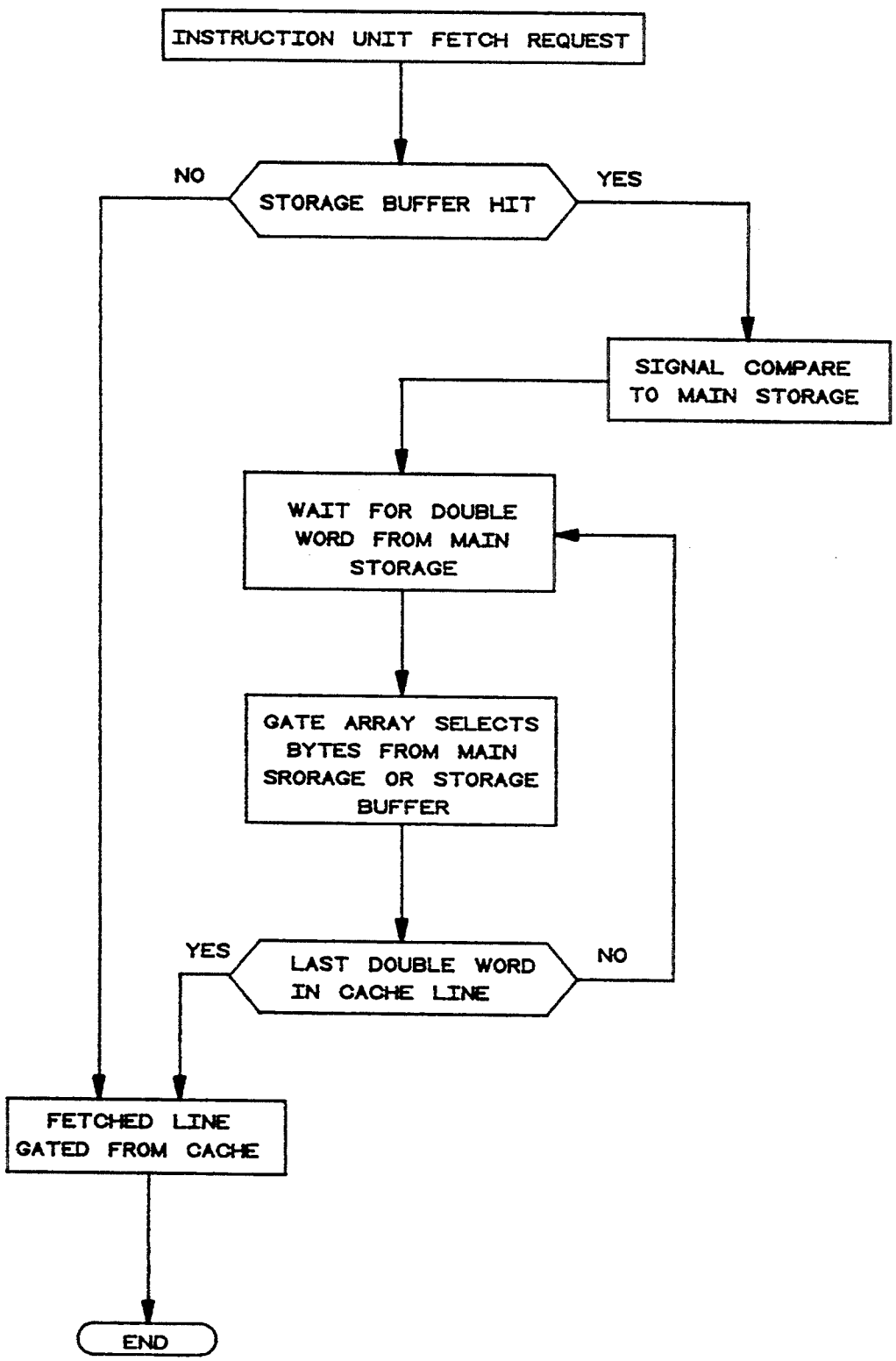
FIG. 4a is a data flow diagram of the sequence of operations for a processor fetch request as it is handled by the store buffer.
Figure 4B:
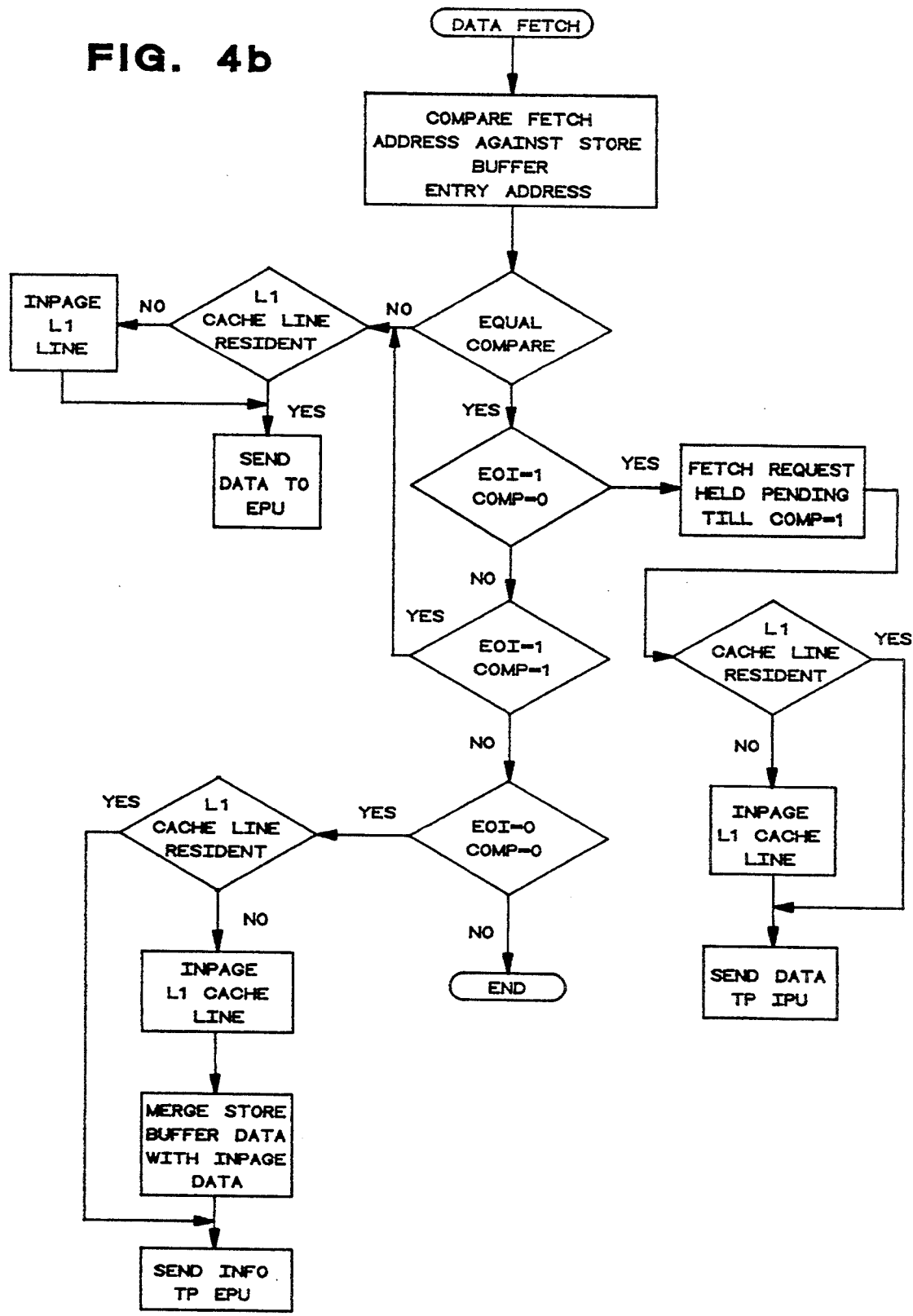
FIG. 4b is a data flow diagram of the sequence of operations for a data fetch request.
Figure 4C:
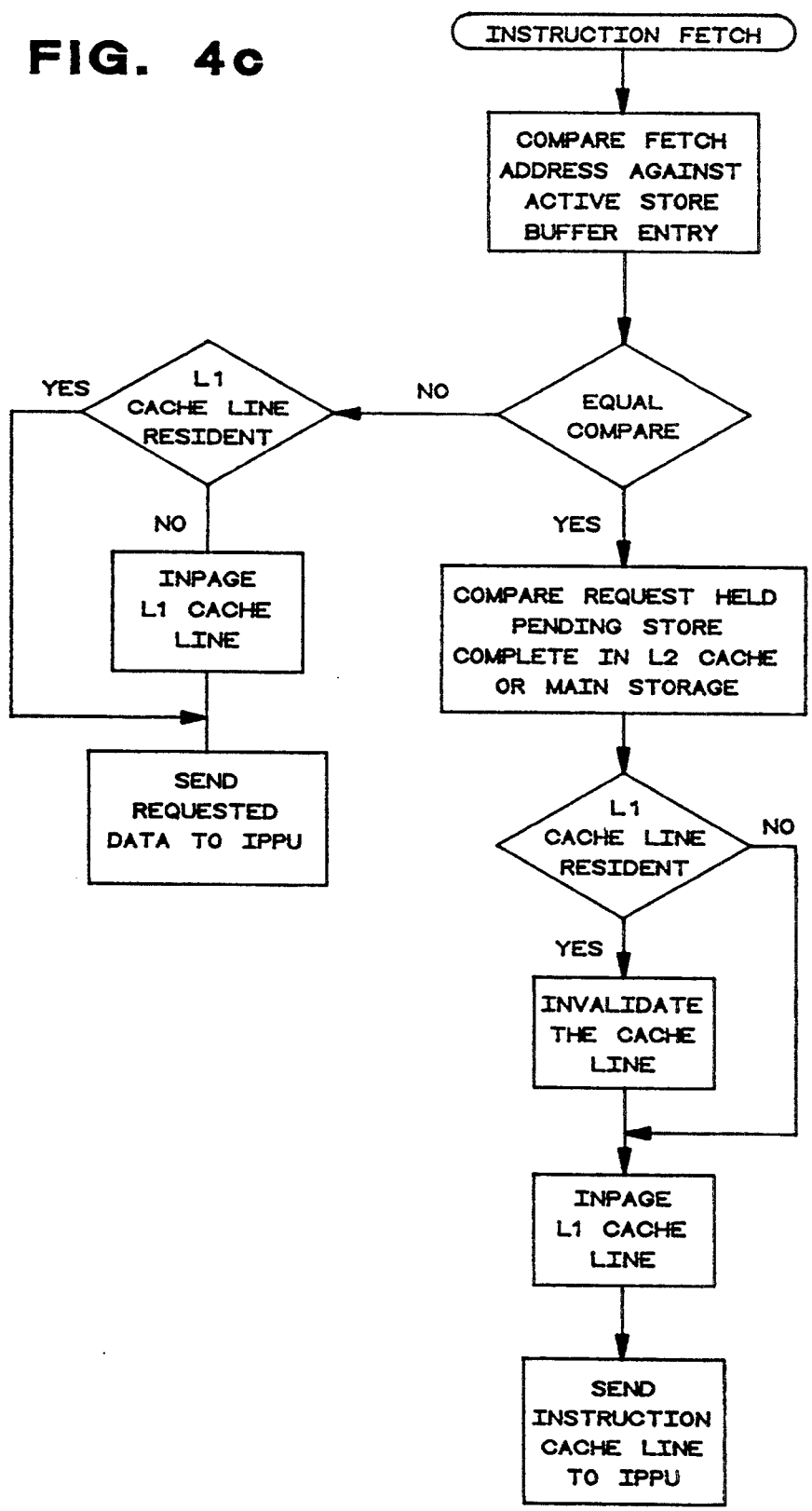
FIG. 4c is a data flow diagram for the sequence of operations for an instruction fetch request.

The details of the fetch operation are shown in FIGS. 4a, 4b, and 4c. A fetch to a line which is resident in the storage buffer 105 is termed a "fetch hit" and a fetch to a line which is not in the storage buffer 105 is termed a "fetch miss".

With reference to FIG. 4a, a fetch to a line which is resident in the storage buffer 105 is termed a "fetch hit" and a fetch to a line which is not in the storage buffer 105 is termed a fetch miss. An entire line referenced by a storage buffer 105 fetch hit is read out of L2 cache 170a or main storage 180b and merged with the contents of the corresponding slot in storage buffer 105. The merging is done by a conventional data gating circuit under the control of the marks in storage buffer 105. The merged cache line is then forwarded to the cache of the requesting instruction unit.

A fetch miss results in the referenced line being read out of main storage 180a or 180b and sent to the cache of the requesting instruction processing unit. The storage buffer is not affected.

Both instruction fetch and operand fetch operations are interlocked against the store buffer entries which are not stored into the L2 cache or main storage. This is to remain consistent with the one copy store concept of the IBM System/370 architecture.

The operand data fetch interlock operation is illustrated in FIG. 4b. All fetches are interlocked against active store buffer entries (EOI=1 and COMP=0). These entries represent pending store from previous instructions that are not written into L2 cache or main storage. The fetch will be allowed when the data is stored into the L2 cache or main storage and the COMP bit of the store buffer entry is set.

For data fetch requests referencing store buffer entries (EOI=0 and COMP=0) modified by the current instruction or store buffer entries (EOI=1 and COMP=1) from previously completed instructions, the requested data is sent to the processor if there is a cache hit. For an L1 cache miss, the fetch request is held pending the completion of an inpage of the L1 line from the L2 cache or L3 main storage.

With reference to FIG. 4c, instruction fetches are interlocked against all active store buffer entries (COMP=0) in single processor or multiprocessor configurations. The fetch address of the prefetched instruction is checked against the address of the store buffer entries with COMP status bit equal to zero. If there is an equal comparison, the fetch request is delayed until the store buffer entry is stored into the L2 cache or L2 main storage and the COMP bit is set for the entry. The instruction cache line is then invalidated if it is resident in the cache. The instruction cache line will then be inpaged from the L2 cache or from L3 main storage.

Figure 5:
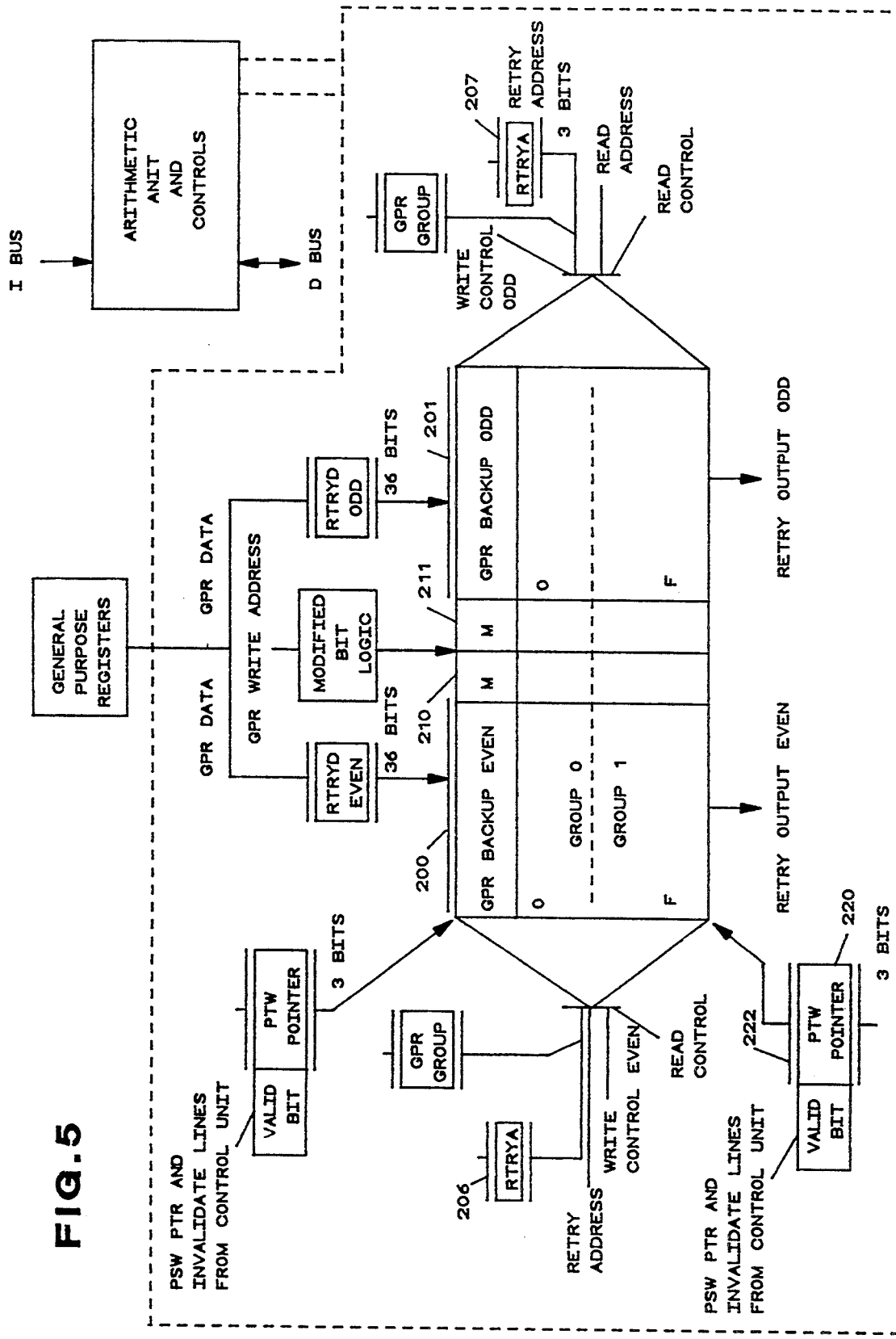
FIG. 5 is a schematic diagram of the buffer arrangement for the general purpose registers in an instruction retry system according to this invention.

The fashion in which the general purpose registers are backed up is shown in FIG. 5. When a new checkpoint is established, the IPPU, which contains the program status word stack, sends out a pointer to the different logical units which contain the floating point register in the floating point unit (FPU), the general purpose registers (GPR) in the execution processing unit (EPU) and the address register (AR) in the external unit (EXT) responsible for inter-processor communication. The three bit pointer is used to signal that a new checkpoint has been started. The FPU, EPU and EXT units will assign this pointer to one of their backup arrays to synchronize a checkpoint. As execution of the instruction begins, each unit saves the old contents of their registers in a backup array before the data is altered. The backup process is continuous and proceeds until a new checkpoint is started.

A PSW is shown as complete when the associated register operations are completed. A PSW pointer is then invalidated in each of the units. The backup arrays are then available for use with the new checkpoint.

As shown in FIG. 5, there are two arrays, GPR backup even 200 and GPR backup odd 201 for backup of the general purpose registers. Each array consists of 16 backup registers. The GPR retry bit, stored in either unit 206 for the even array and in unit 207 for the odd array, shows which of the two arrays is being used. The modified bit position 210 for the even array and 211 for the odd array shows that the GPR has been modified and the content before the modification is in the backup array. The entries which are to be restored are those which have a bit in the modified position, i.e., those registers which have changed data.

There is a PSW pointer and valid bit 222 associated with each GPR backup array. The PSW pointer is used in determining if all GPR writes are complete in that checkpoint to mark the PSW complete bit. The valid bit 22 is used to show the array's reusability.

Similar backup arrays are used to backup the FPR's. Two backup arrays, not shown, each consisting of four FPR's each, are used to save the FPR data prior to modification. The backup operation is performed each time data in a FPR is destined to be modified. One backup array is used for each checkpoint period. A FPR retry group bit shows which array is currently being used. Similarly, a modified bit in an entry shows that the FPR data has been modified and the contents before modification are in the FPR backup array. The modified entries are those which must be restored during backup by the instruction retry operation.

Also similar to the previously described GPR backup, each of the FPR backup arrays has associated therewith a PSW pointer and valid bit. The PSW pointer is used in determining if all the FPR writes in a checkpoint are complete to mark the PSW complete bit. The valid bit is used to show the reusability of the array.

In similar fashion, data in the access registers (AR's) is backed up in two arrays each consisting of 16 AR's. The backup is performed when the data in an AR is to be modified for the first time during a checkpoint period. One backup array is used for each checkpoint period that modifies the content of the AR. An AR retry group bit shows which array is currently in use. The unmodified bit shows that an AR has been modified and the contents prior to modification are in the AR backup array.

There is also a PSW pointer associated with each AR backup array. When the PSW pointer contains all ones, it shows that the AR backup array is invalid. The PSW pointer is used in determining if all AR writes are complete in a checkpoint to mark the PSW complete bit. The AR backup array includes a valid status bit which shows the array's reusability.

Figure 6:
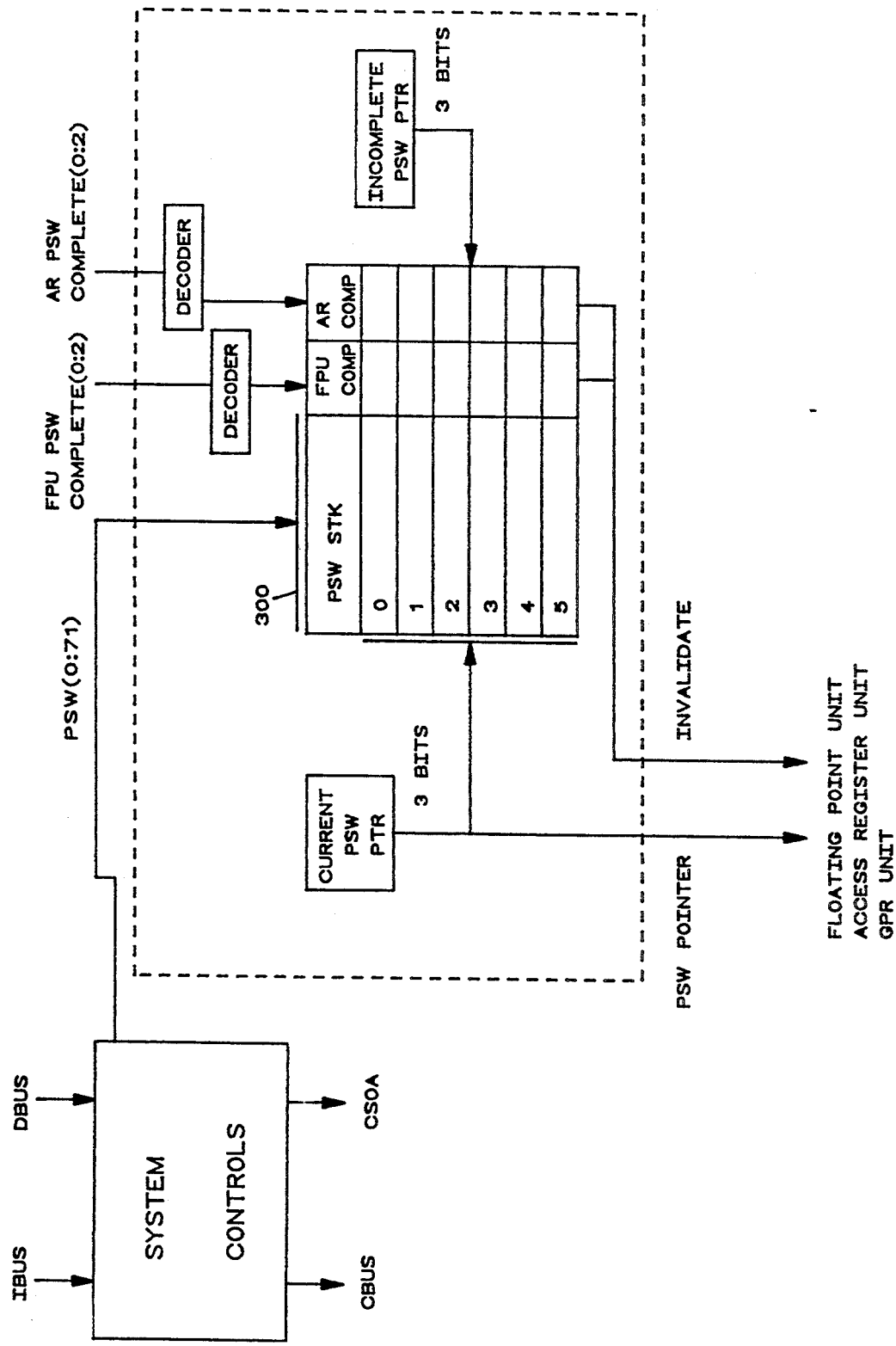
FIG. 6 is a schematic diagram of the program status word stack in an instruction retry system according to this invention.

When a checkpoint is established, the full PSW is saved in a PSW stack as shown in FIG. 6. The PSW stack 300 has 6 entries 0-5 and is updated in sequential order by the system controls. An entry can be reused when its status is marked complete.

The PSW stack controls are derived from the instruction being executed by the processor. A checkpoint is created whenever the instruction requires a different retry procedure than was used for the previous checkpoint. Checkpoints are established for the following cases:

Decode of an IBM System/370 store type instruction to make data visible as soon as possible to other processors or to the channel subsystem;

Decode of an IBM System/370 LM (Load Multiple) instruction and LAM (Load Access Multiple) instructions since these instructions can access large blocks of data that can cross storage page boundaries, so access exception pretesting does not have to occur;

Decode of a microcoded IBM System/370 instruction since it is possible to include store type instructions in a microcode routine;

Decode of the instruction that follows any of the above instructions to effectively isolate these special cases; and, Decode of the "TAKE CHECKPOINT" microword to be able to handle large data movements without overflowing the L1 store buffer in microcode routines.

A checkpoint may also consist of multiple instructions, such as those which involve operations on a GPR unit, an FPR unit, an AR unit or any combination of these. When a new checkpoint is reached, the PSW pointer is broadcast to all processing units via the PSW pointer (PTR) bus shown in FIG. 2. Each processing unit is responsible for labeling all operations currently and later requested with the new PSW pointer. Each processing unit must also notify the IPPU when all operations associated with the last checkpoint are completed. Each entry in the PSW stack contains the "processing unit complete" bits. A processing unit complete bit is set whenever the associated unit responded complete. That is, when all the operations associated with the last checkpoint have been completed. The FPU signals checkpoint complete through the FPU completed pointer bus shown in FIG. 2. The AR signals checkpoint complete via the AR Completed pointer shown in FIG. 2. The PSW stack is located in the IPPU, which consists of global controls for the EPU, in which the GPR backup registers are located. The global controls keep track of all GPR operations and detect the completion of all EPU operations within a checkpoint. Thus, the EPU need not actively signal completion of its operations. When the IPPU detects that all of the processing complete bits are set, the IPPU begins to clear that checkpoint. A checkpoint is cleared when the backups are invalidated and the PSW stack entry is marked complete. The IPPU invalidates the backups associated with the checkpoint by broadcasting to the processing units. The PSW entry is marked complete at the same time. After the backup invalidation and PSW entry completion, all information associated with the checkpoint becomes invalid and the backup arrays and PSW entry can be used for a new checkpoint.

Referring back to the showing in FIG. 1, all CPU initiated store operations will make an entry in the L1 store buffer queue, which, as previously mentioned, is common to both the systems with a store-in L2 cache and the processor without a store-in L2 cache. An L1 store buffer queue entry consists of an absolute address, data, fields identifying which double words and/or bytes are modified and two flags which are significant to instruction retry, the end of instruction (EOI) bit and checkpoint complete (COMP) bit. The EOI bit indicates that the entry is for stores of the current instruction with a value of 0, or for stores of the previous instruction with a value of 1. The EOI signal is sent to the L1 store buffer control by the CPU at the end of a checkpoint.

The checkpoint complete bit shows whether the corresponding data has been successfully stored into the L2 cache or the L3 memory where the data is visible to the CPU's or channel subsystems.

There are two cases which create a new store buffer queue entry with EOI=1 and COMP=0: if the IPU is processing interrupts and not executing instructions; or a store queue release flag is sent prior to a store, which makes a microcoded instruction unretryable. In these two cases, store buffer queue entries are immediately sent to the L2 cache or to L3 memory, depending on the system configuration. Errors detected during the execution of these cases are generally not retryable and no restoration to the checkpoint state is necessary.

TO maintain storage consistency within the processor, fetches to storage are interlocked against store buffer queue entries with EOI=1 and COMP=0. These entries represent pending stores from previous instructions. All fetches are interlocked, including those for instruction fetch, operand fetch, and dynamic address translation (DATA) table fetch made by the processor. When an operand fetch request is initiated, the fetch absolute address is compared to the L1 store buffer queue entries. If there is a match on the store queue entries with EOI=1 and COMP=0, the fetch is held pending completion of the storage request to the L2 cache or L3 memory, as the case may be.

For a processor with a store-in L2 cache, the EOI signal is sent to the L1 store buffer control at the end of a checkpoint. The EOI bit of all the store queue entries of a checkpoint will be set to 1 to show the store queue entries are to be written to the L2 cache. Once the L1 store buffer queue entries are written into the L2 cache, the L2 cache control will signal the L1 store buffer control to set the checkpoint complete bit on all L1 store buffer store queue entries of a checkpoint. Thus, these entries will be available for the storage operations of the next checkpoint. In addition to the eight L1 store buffer queue entries, additional buffers are provided in the L2 cache control for the consolidation and transfer of data to the L2 cache. When storage data is stored in the L1 store buffer queue, the L1 store buffer control will migrate the entries to L2 store queues and the associated write buffer. The L2 cache control will initiate the L2 cache operations in response to the receipt of an EOI signal from the L1 store buffer control. Since the L2 cache is a store-in type, the store data will not be placed into the L3 main storage until an outpage operation is initiated by the L2 cache control.

For processors without a store-in L2 cache, the storage data for all CPU initiated operations will be enqued in the L1 store buffer queue in the same fashion as was the case with the processor having an L2 cache. The L3 control also provides additional store queues and write buffers to buffer the storage data migrating toward memory. From the L1 store buffer control's standpoint, interfaces to L3 control and to L2 cache control are the same. The EOI signal is sent to the L1 store buffer control at the end of a checkpoint, and the EOI bit of all the L1 store buffer entries for a checkpoint are set to 1 to indicate that the entries are to be written to the L3 main storage. The L1 store buffer queue entries are then transferred to the L3 main storage store queue and then the write buffer in the L3 control. When data is written into L3 main storage, the L3 control will signal L1 store buffer control to set the checkpoint complete bit for the received store queue entries. These entries are then available for store operations of the next checkpoint.

For a hardwired store instruction with only one store queue update, the EOI bit of the L1 store buffer queue entry is set to 1 at the same time the store queue data is enqueued. For microcoded store instructions, the EOI bits of all the store queue entries associated with a checkpoint are not set to 1 until the EOI signal is sent to the L1 store buffer control. The checkpoint complete bit is set for all store queue entries when the L2 cache control or L3 control has successfully completed the storage operation into L2 cache or L3 main storage, as the case may be.

When an error occurs in the CPU, the clock of the IPU and the L1 store buffer will be stopped and the L2 cache control or L3 control will immediately, pending completion of the current command, stop servicing any pending storage commands for the IPU.

The instruction retry mechanism is then invoked to restore the processor to a previous checkpoint state. In addition to restoration of data to various registers from the associated backup arrays, the store queue entries with EOI=1 will be flushed to the L2 cache or L3 main memory, depending on the system configuration, and the entries with EOI=0 will be purged.

When a CPU detects an error, the clock of the CPU is stopped in two cycles. A CPU clock stop signal is developed by conventional error detection circuitry and sent to the L3 store buffer control which then stops servicing the CPU. To recover from the error, the CPU is scan reset, that is, all latches in the CPU are set to a restart state. The restoration of the various registers is done by conventional microcode routines. The microcode determines the extent of restoration required by examination of the PSW stack. The PSW stack entry has the PSW pointer to be used to select the corresponding register backup array for restoration. The AR's, FR's, and GPR's are then restored from the backup arrays. After register restoration, the PSW's in the PSW stack will be set to a complete status and the register backup arrays will be invalidated. The status of the L1 directory and the L1 status in the L2 cache control will be reset for a processor with an L2 cache. For processors without an L2 cache, the channel directory and the L1 directory will be reset. The L1 store queue entries with EOI=1 will be flushed to L2 cache or to L3 main storage, as the case may be. The store queue entries with EOI=0 for the affected checkpoint will be purged for all of the store queues and the write buffer.

During a retry operation, a hardwired controller is set to show the number of incomplete checkpoints needed for recovery. The PSW keeps track of the progress of the retry operation. When all of the incomplete checkpoints are retried and completed error free, and the counter has gone to zero, an interrupt is generated to signal a successful completion of a checkpoint retry to an independent, system support processor.

If a second error should occur, it can be determined to have occurred during the retry operation by the fact that the counter has not yet gone to zero. If this occurs, the instruction retry is simply restarted. A microcode controlled counter keeps track of the number of unsuccessful attempts to recover and, at a preselected number of such unsuccessful attempts, stops the retry operation and generates a system damage signal.

Figure 7:
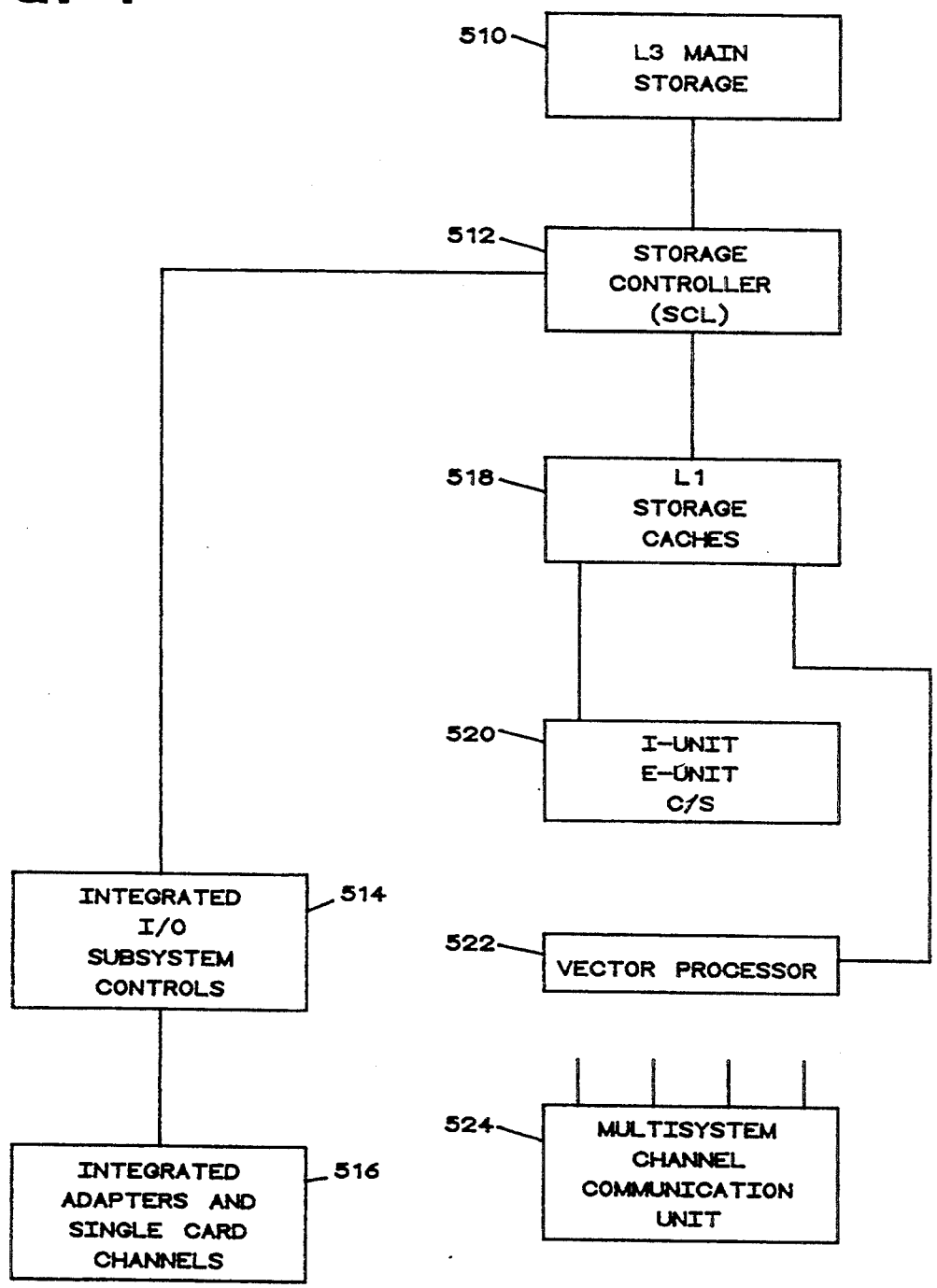
FIG. 7 is a system diagram of a uniprocessor computing system for use with the instruction retry of this invention.

Having described the invention apart from the data processing system in which it would be implemented, a data processing system for use with the invention is shown in FIG. 7. The single processor, or uniprocessor system comprises an L3 main storage 510 connected to a storage controller (SCL) 512. Storage controller 512 is connected to the integrated I/O subsystem controls 514, which in turn connect to integrated adapters and single card channels 516. Storage controller 512 is also connected to the L1 storage cache 518 which accommodates the storage of instructions and data. L1 cache 518 is connected to the instruction unit (I-unit), execution unit (E-unit), and control store 520. L1 storage cache is also connected to vector processor 522 which is described in more detail in the patent application entitled "High Performance Parallel Vector Processor", Ser. No. 06/530,842, filed Sep. 9, 1983, and assigned to IBM Corporation, the assignee of this patent. The disclosure of patent application Ser. No. 06/530,842 is incorporated herein by reference. The uniprocessor system will also include a multisystem channel communication unit 524 to accommodate the exchange of data with other processing systems.

L3 main storage 510 will normally be made up of "intelligent" memory cards, so called because of the inclusion of error checking and correction, refresh address registers and counters, and spare bit capability. The interface to the L3 storage will usually be 8 bytes wide. The capacity of L3 main storage can range from 8 to 64 megabytes.

Access to L3 main storage 510 is under the control of storage controller 512 which has three bus arbiters controlling access to L3 main storage 510, to the integrated subsystem controls 514 and the L1 storage caches 518. The storage controller also included a directory which is responsible for searching the L1 storage caches 518 for requested data. If the data is resident in L1 storage caches 518, but is obsolete, the storage controller 512 invalidates the obsolete data in the L1 storage caches 518 thereby allowing the I/O subsystem controls 514 to update the data in L3 main storage 510. Thereafter, instruction and execution unit 520 must obtain the updated data from L3 main storage 510.

The storage controller 512 also includes a plurality of buffers for buffering data being input to L3 main storage 510 from the I/O subsystem controls 514 and for buffering data being input to L3 main storage 0 from instruction/execution unit 520. The buffer associated with the instruction/execution units 520 is desirably a 256 byte line buffer which allows the building of entries 8 bytes at a time. This is desirable to accommodate certain types of instructions such a sequential operations. When this line buffer is full, a block transfer of data to L3 main storage is made, thereby reducing the number of store operations required to transfer a given block of data and speeding up the system operation.

The L1 storage cache will normally include a plurality of 16 k byte caches. Since the interface to storage controller 512 from the L1 storage caches 518 is 8 bytes wide, an inpage operation from storage controller 512 requires 8 data transfer cycles. L1 storage caches 518 are store-through caches. Data from instruction/execution units 520 will be stored in L3 main storage 510 and is not stored in L1 storage cache 518 unless the corresponding, but now obsolete, data was already resident in L1 storage caches 518. To assist in this operation a store buffer, described with reference to FIGS. 1-6, is present in L1 storage caches 518. The store buffer can buffer up to 8 store operations.

Vector processor 522 is also connected to L1 storage caches 518. Vector processor 522 shares the data flow path of the instruction/execution unit 520 into storage controller 512, but the vector processor, when performing storage operations, prevents the instruction/execution unit 520 from accessing storage controller 512 for fetching data.

Integrated I/o subsystem 514 is connected to the storage controller 512 over an 8 byte bus. The subsystem 514 includes three 64 byte buffers used to synchronize storage controller 512 with data coming from the integrated I/O subsystem 514. This is required because the instruction execution unit 520 and the I/O subsystem 514 operate on different clocks.

The multisystem channel communication unit 524 is a four port channel to channel adapter and will normally be included in a package which is external to the system.

The store buffer in L1 storage caches functions in the manner previously described with reference to FIGS. 1-6.

Figure 8:
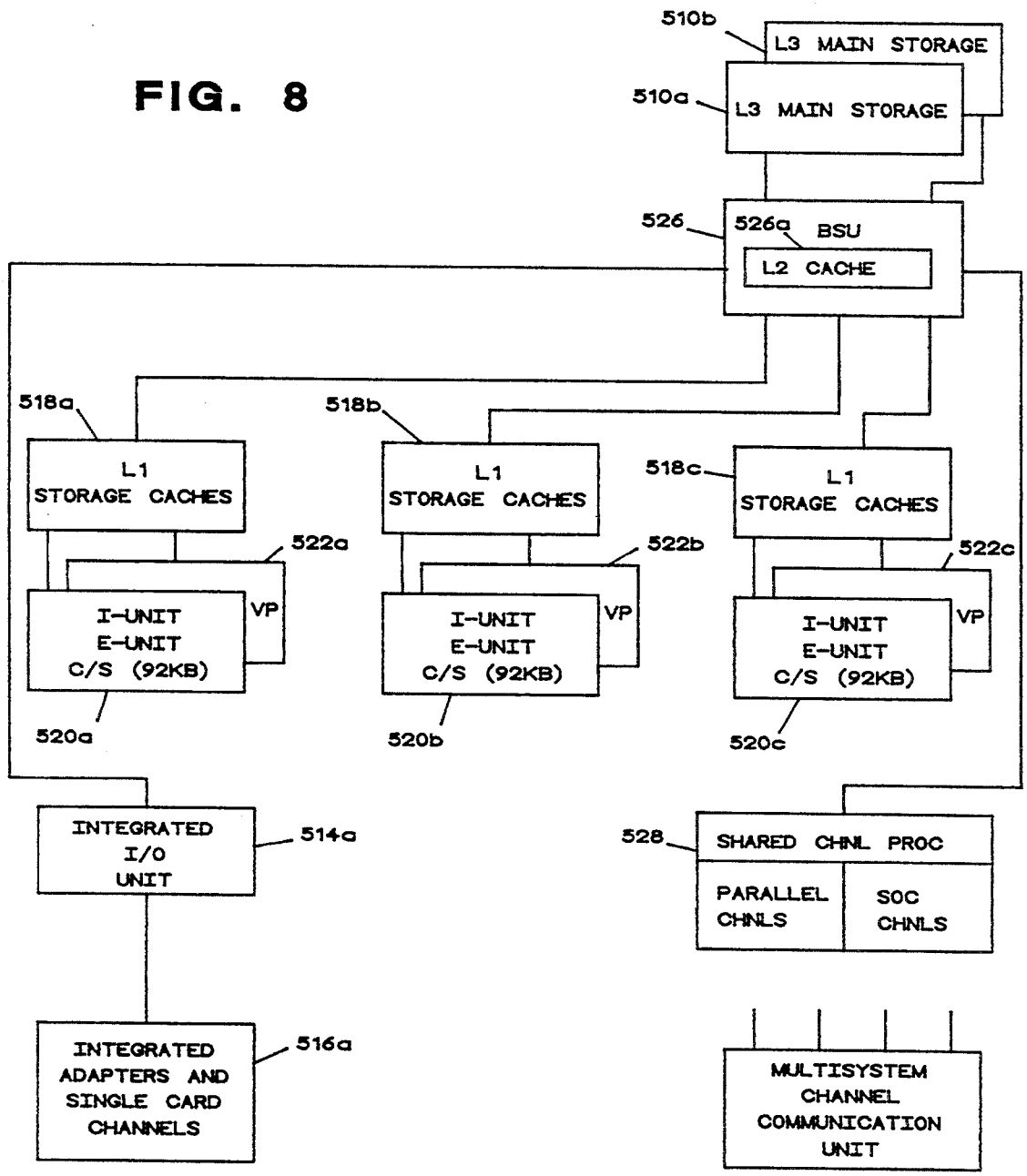
FIG. 8 is a system diagram of a multiprocessor (three processors, i.e. triadic) computing system for use with the instruction retry of this invention.

The system shown in FIG. 8 includes a pair of L3 main storage units 510a and 510b connected to bus switching unit (BSU) 526. The bus switching unit 526 includes an L2 cache 526a. BSU 526 is connected to integrated I/O subsystem 514a, to shared channel processors 528 and to three processors each having an instruction unit/execution unit/control store 520a, 520b and 520c, respectively, and L1 storage caches 518a, 518b and 518c, respectively.

The cache in the BSU 526 is termed L2 cache 526a. BSU 526 connects the three processors 518a/520a, 518b/520b, 518c/520c, ports to the two L3 main storage units 510a and 510b, two shared channel processors 528 and an integrated I/O subsystem 514a. The circuits of BSU 526 decide the priority for requests from each of the three processors to L3 main storage 510a and 510b. Requests from the I/O subsystem 514 or shared channel processors circuits which operate the interfaces and circuits which access the L2 cache 526a. The L2 cache is a "store in" cache, meaning that operations which access the L2 cache to modify data must also modify the data resident in the L2 cache. The only exception to this rule is that, if the operation originates from the I/O subsystem 514, and if the data is resident only in L3 main storage 510a/510b and not in L2 cache 526a, the data is modified only in L3 main storage, not in L2 cache.

The interface between the BSU 526 and the L3 main storage units 510a/510b includes two 16 byte lines instead of the single 8 byte line of FIG. 7. However, the storage unit 510 of FIG. 7 is identical in all other respects to the storage unit 510a/510b of FIG. 8. The two memory units 510a/510b are accessed in parallel.

The shared channel processor 528 is connected to the BSU 526 over two 8 byte interfaces. The shared channel processor is operated at a frequency which is independent of the BSU 526. The clocks within the BSU 526 are synchronized with the clocks in the shared channel processor 528 in a manner which is similar to the clock synchronization between storage controller 512 and the integrated I/O subsystem 514 of FIG. 1.

Referring again to FIG. 7, instructions are normally resident in the L1 instruction cache 518 while waiting to be executed. The instruction/execution unit 520 searches a directory located within L1 cache 518 to determine if the instruction is resident. If the instruction is not present, the instruction/execution unit 520 generates a storage request to storage controller 512. The address of the instruction, or the cache line containing the instruction is provided to the storage controller 512. The storage controller 512 arbitrates access to the bus leading to L3 main storage 510.

The request from the instruction/execution unit 520 is passed to L3 main storage 510 in the form of a command indicating that a line in L3 main storage is to be fetched for transfer to the instruction/execution unit 520. L3 main storage 510 latches the request, decodes it, selects the location in the memory card where the instruction is stored, and delivers the instruction to the storage controller 512 in 8 byte increments. The instruction is then transmitted from the storage controller 512 to the L1 instruction cache 518 for temporary storage before eventual transfer to the instruction/execution unit 520. After reaching instruction/execution unit 520, the instruction is decoded, which may indicate that an operand resident in L3 main storage 510 is needed in order to proceed with execution. If this is the case, the instruction/execution unit 520 searches the directory in L1 data cache 518. If the operand is not found in the directory, a storage access to L3 main storage 510 is issued by the instruction/execution unit 520. The fetched operand is placed in L1 data cache as a result of the storage access where it is available to the instruction/execution unit 520. If the instruction requires use the of microcode, the instruction/execution unit 520 makes use of the microcode resident on the instruction-/execution unit card. If an input/output (I/O) operation is to be performed, the instruction/execution unit 520 makes the appropriate decode and proceeds with execution by informing the integrated I/O subsystem 514 that information is stored in an auxiliary portion of L3 main storage unit 510. The processors associated with I/O subsystem 514 then access L3 main storage 510 to fetch the information and complete execution of the instruction.

The system of FIG. 8 operates in much the same fashion. A particular one of the instruction/execution units 520a, 520b or 520c requires an instruction and searches its own, dedicated L1 storage cache. In the event that the instruction is not resident in the cache, the instruction/execution unit requests access to the BSU 526 in order to search the L2 cache. The BSU 526 contains an arbiter which receives requests from each of the instruction/execution units 520a, 520b, 520c, from the shared channel processor 528 and from the integrated I/O subsystem 514, and grants access to one of these units at a time. When a particular one of the instruction/execution units 520a, 520b, 520c is granted access to BSU 526 to search the L2 cache 526a, the selected instruction/execution unit searches the directory of the L2 cache 526a for the desired instruction. In the event that the desired instruction is found, it is simply returned to the selected instruction/execution unit. If the desired instruction is not located within the L2 cache 526a, as indicated by its absence from the directory, a request is made to the L3 main storage unit, either 510a or 510b, for the desired instruction. The desired instruction is located in L3 main storage and transmitted to BSU 526, 16 bytes at a time, and passed to the selected instruction/execution unit while being simultaneously stored in L2 cache 526a of the BSU 526.

Additional functions resident within BSU 526 relate to the rules for storage consistency in a multiprocessor system. For example, when a particular instruction/execution unit 520c (processor) modifies data, that data must be made visible to all other instruction/execution units in the system. If the processor 520c modifies data stored in its own L1 cache 518c, a search for that particular data is made in the L2 cache directory 526a of the BSU 526. If the data is found, it is modified to make it consistent with the modified data in cache 518c.

The availability of the modified data in the L2 cache 526a makes the modified data available to the other processors, 520a and 520b, in the system, allowing them to correct the data which may be resident in their L1 caches, 518a and 518b, respectively. The processor 520c cannot reaccess the particular data until the other processors 520a and 520b have had a chance to modify their own data.

Figure 9:
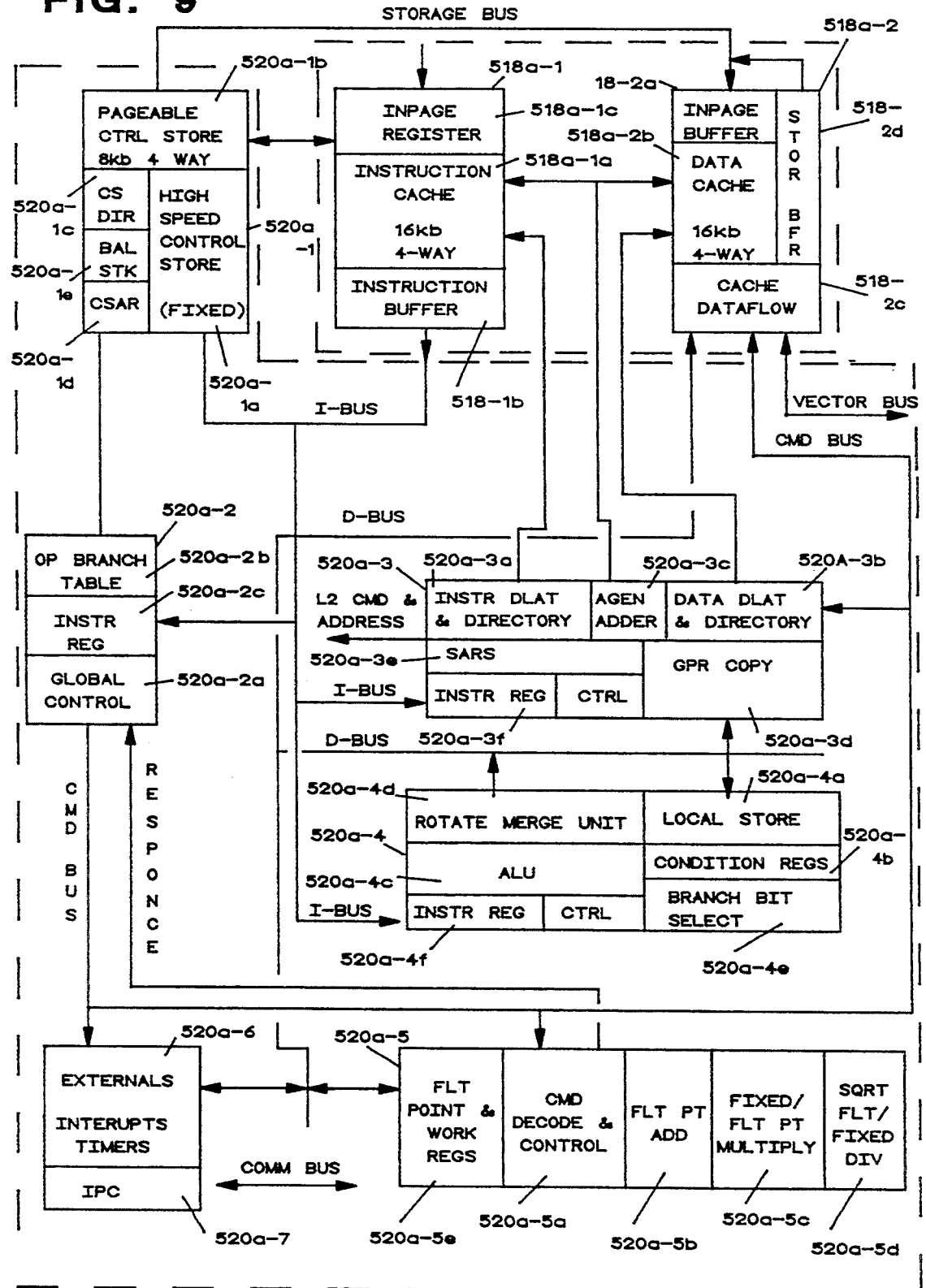
FIG. 9 is a detailed system diagram of the computing system shown in FIG. 8.

With reference to FIG. 9, the details of the instruction/execution unit 520a will be discussed. This unit may be variously termed "processor", "instruction processing unit" or instruction/execution unit as in the previous discussion. For the purpose of the following description, the term processor will be used.

The processor 520a includes a control store subsystem 520a-1, which has a high speed fixed control store 520a-1a of approximately 84 k bytes, a pageable area 520a-1b which is 8 k bytes, 2 k words, 4-way associative, a directory 520a-1c for the pageable control store 520a-1b, a control store address register (CSAR) 520a-1d, and an 8-element branch and link facility (BAL STK) 520a-1e. Machine state controls 520a-2 include the global controls 520a-2a for the processor, an operation branch table 520a-2b connected to CSAR by the control store origin address bus and used to generate the initial address for the microcoded instructions.

An address generation unit 520a-3 comprises three chips, the instruction cache DLAT and directory 520a-3a, the data cache DLAT and directory 520a-3b, and the address generation chip 520a-3c connected to the L1 cache 518a via the address bus. The instruction DLAT and directory 520a-3a is connected to the instruction cache portion 518a-1a of the L1 cache 518a via four "hit" lines which indicate that the requested instruction will be found in the instruction cache portion 518a-1a of L1 cache 518a. Similarly, four "hit" lines connect the data DLAT and directory 520a-3b with the data cache portion 518a-2b of L1 cache 518a, indicating ..that the requested data is within the data cache portion 518a-2b. The address generation unit 20a-3 contains copies of the 16 general purpose registers used to generate addresses at portion 520a-1d. The portion 520a-3e includes three storage address registers used to provide addresses to microcode for instruction execution.

A fixed point instruction unit 520a-4 is connected to data cache 518a-2 by the Data bus (D-bus). Fixed point instruction unit 520a-4 includes a local store stack (local store) 520a-4a which contains the 16 general purpose registers and a number of other registers used exclusively as working registers by the microcode. Condition registers 520a-4b which contain the results of a number of arithmetic and shift operations, as well as the results of an IBM System 370 type condition code. Fixed point instruction unit 520a-4 also includes a four byte arithmetic logic unit (ALU) 520a-4c; an 8 byte rotate merge unit 520a-4d; branch bit select hardware 520a-4e which allows the selection of bits from various registers which determine the direction of a branch operation, the bits being selected from general purpose registers, working registers and the condition registers.

A floating point processor 520a-5 includes floating point registers and four microcode working registers 520a-5e, a command decode and control function 520a-5a, a floating point adder 520a-5b, a fixed point and floating point multiply array 520a-5c and a square-root and divide facility 520a-5d. The floating point processor 520a-5 is disclosed in more detail in co-pending patent application Ser. No. 07/102,985, entitled "Dynamic Multiple Instruction Stream, Multiple Data Multiple Pipeline Apparatus for Floating Point Single Instruction Single Stream Data Architecture" filed Sep. 30, 1987 which is incorporated by reference into this patent application.

The ALU 520a-4c contains an adder which is disclosed in co-pending patent application Ser. No. 07/066,580, entitled "A High Performance Parallel Binary Byte Adder" filed Jun. 26,1987, which is incorporated by reference into this patent application.

An externals chip 520a-6 includes timers and an interrupt structure for the handling of interrupts from the I/O subsystem 514a and other sources. An interprocessor communications facility (IPC) 520a-7 is connected to the storage subsystem over a communications bus, thereby allowing the processors to pass messages to each other and to provide access to the time of day clock.

The L1 cache of the system shown in FIG. 9 includes an instruction cache 518a-1 having a 16 k byte 4-way cache 518a-1a, a 16 byte instruction buffer 518a-1b at the output thereof, and an 8 byte inpage register 518a-1c at the input from storage. The storage bus, connected to the instruction cache 518a-1 at the inpage register 518a-1c, is eight bytes wide. The other end of the storage bus is connected to the control store subsystem 520a-1 and provides data to the subsystem in the event of a pageable control store miss and new data must be brought into the control store.

A data cache 518a-2 comprises an inpage buffer 518a-2 also connected to the storage bus; a data cache 518a-2b which is a 16k 4-way cache; a cache data overflow 518a-2c having a plurality of input and output registers and connected to the processor over an 8 byte data bus (D-Bus) and to the vector processor 522a over an 8 byte vector bus and an 8 element store buffer (STOR BFR) 518a-2d.

The system operation begins with the execution of an instruction located in the instruction cache 518a-1a. The instruction is fetched from the instruction cache 518a-1a and is stored in the instruction buffer 518a-1b. Since the ultimate speed of operation of the system depends on having an instruction in the instruction buffer 518a-1b ready for execution every attempt is made to keep the instruction buffer full at all times.

The instruction is fetched from the instruction buffer 518a-1b and is stored in the instruction registers 520a-3f of the address generation chip 520a-3, the instruction registers 520a-4f of fixed point execution unit 520a-4, and the instruction register 520a-2c of the machine state controls 520a-2, at which point the instruction decoding begins.

Operands are fetched from the GPR COPY unit 520a-1d in the address generation unit 520a-3 in the case where an operand is required. Normally, GPR COPY is accessed if operands are required for the base and index registers for an RX instruction.

The address generation process begins in the next cycle. The base and index register contents are added to a displacement field derived from the instruction and the resulting effective address is generated and sent to the data cache 518a-2 and/or the instruction cache 518a-1. In the case where an operand is sought the effective address is sent to the data DLAT and directory chip 520a-3b.

Access to the cache and directories begins in the third cycle. The DLAT 520a-3b will determine if the address is translatable from an effective address to an absolute address. After the translation is performed, the translated address is compared with the output of cache directory 520a-3b. In the event that the data had been previously fetched into the cache 518a-2b, the directory output and the DLAT output are compared, if they compare equal, one of the four "hit" lines are generated from the data DLAT and directory 520a-3b. The hit lines are connected to the data cache 518a-2b; a generated hit line will indicate which of the four associativity classes contains the data that is wished to be retrieved. On the next cycle, the data cache 518a-2b output is gated through a fetch alignment shifter in the cache data 518a-2c, appropriately shifted and transmitted over the D-BUS to the fixed point execution unit 520a-4 where it is latched into the ALU 520a-4c. This is the access of operand 2 of an RX type of instruction.

In parallel with this shifting process, operand 1 is accessed from the general purpose registers in local store 520a-4a. As a result, the two operands are latched in the input of the ALU 520a-4c if this is necessary. In the fifth cycle, the ALU 520a-4c will process the two operands (add, subtract, multiply, divide, etc.) as dictated by the instruction op code. At the end of the fifth cycle, the output of the ALU 520a-4c is latched and the condition registers 520a-4b are latched to indicate a zero or overflow condition. In the sixth cycle, the output of the ALU 520a-4c is written back into the local store 520a-4a and into the GPR copy 520a-3d of the address generation unit 520a-3 in order to keep the GPR copy 520a-3d in sync with the content of the local store 520a-4a. When the decode cycle of this instruction is complete, the decode cycle of the next instruction may begin, thereby allowing up to six instructions to be in the decoding or execution process at any one time.

Certain instructions require the use of microcode to complete execution. Therefore, during the decode cycle, the op-branch table 520a-2b is searched using the op code from the instruction as an address. Thus accessed, the op-branch table provides the beginning address of the microcode routine needed to execute the instruction. These instructions, as well as certain others, require more than one cycle to complete. In such cases, instruction decoding is suspended while the op-branch table is being searched. In the case of microcode, the I-BUS is utilized to provide microinstructions to the decoding hardware. The instruction cache 518a-1a is shut off, the control store 520a-1a is turned on, and the microinstructions are passed over the I-BUS. For floating point instructions, decoding proceeds as previously described except that during the address generation cycle, a command is sent to the floating point unit 520a-5 to indicate and identify the proper operation to be performed. Execution of the floating point instruction is commenced and, when complete, the results are returned to the fixed point execution unit 520a-4. The "results" in this case being condition Code, and any interrupt conditions, such as overflow.

The system of FIG. 9 operates in pipeline fashion. The first stage of the pipeline is termed instruction decode. In the case of an RX instruction, where one operand is in memory, the base and index register contents must be obtained for the GPR COPY 520a-3d. A displacement field is added to the base and index registers. At the beginning of the next cycle, the addition of the base, index and displacement fields is completed to yield an effective address. The effective address is sent to the DLAT and Directory chips 520a-3a/520a-3b. The high order portion of the effective address must be translated, but the low order portion is not translated and is sent to the cache 518a-1a/518a-2b. In the third cycle, the cache begins an access operation, using the bits it has obtained. The DLAT directories are searched using a virtual address to obtain an absolute address. This absolute address is compared with the absolute address kept in the cache directory. If this compare is successful, the "hit" line is generated and sent to the cache chip 518a-1a/518a-2b. Meanwhile, the cache chip has accessed all four associativity classes and latches an output accordingly. In the fourth cycle, one of the four "slots" or associativity classes are chosen, the data is aligned, and sent across the data bus to the fixed or floating point processor 520a-4/520a-5. In this fashion, at the end of the fourth cycle., one operand is latched in the ALU 520a-4c input.

Meanwhile, in the processor, other instructions are being executed. The GPR COPY 520a-3d and the local store 520a-4a are accessed to obtain the other operand. At this point, both operands are latched at the input of the ALU 520a-4c. One cycle is taken to do the computation, set the condition registers, and finally, write the result in the general purpose registers in the GPR COPY 520a-3d. The result may be needed for address computation purposes, in which case it is input to the AGEN ADDER 520a-3c.

During the execution of certain instructions, no access to the caches 518a-1a/518a-2b is needed. In such cases, when the instruction decode is completed the results are passed directly to the execution unit without further delay for access to the caches. Therefore, as soon as an instruction is decoded and passed to the address generation chip 520a-3, another instruction is decoded.

We claim:

1. A checkpoint retry storage subsystem for use in a data processing system having registers and having a store-in level two cache or store-through level one cache between an instruction processing unit having a current program status word and a L3 main storage unit, comprising:
   a. means responsive to selected instructions having associated data for developing a checkpoint signal;
   b. a program status word stack storage for storing program status words;
   c. a general purpose register storage for storing the data content of selected ones of said registers in said data processing system;
   d. a data storage comprising a L1 store buffer, having a data store buffer for the retention of data, positioned logically between said instruction processing unit and L3 main storage unit;
   e. checkpoint storage control means responsive to said checkpoint signal and connected to control said program status word storage, said general register storage and said L1 store buffer for storing said current program status word in said program status word storage, for storing the content of said selected ones of said registers in said general purpose register storage and for storing said data associated with said checkpointed instruction in said data store buffer within said L1 store buffer; and,
   f. means for generating a retry signal in response to error signals within said data processing system.

2. A system according to claim 1 wherein said checkpoint storage control means is responsive to said retry signal to fetch said program status word, the content of the general purpose registers and said data associated with said checkpointed instruction and load said program status word, said register content and return said data into a data storage location associated with said checkpointed instruction.

* * * * *